United States Patent
Minnella et al.

(10) Patent No.: US 12,056,074 B2
(45) Date of Patent: Aug. 6, 2024

(54) PROCESSING SYSTEM, RELATED INTEGRATED CIRCUIT, SYSTEM AND METHOD

(71) Applicant: STMicroelectronics S.r.l., Agrate Brianza (IT)

(72) Inventors: Filippo Minnella, Orbassano (IT); Gea Donzelli, Caronno Pertusella (IT)

(73) Assignee: STMicroelectron S.r.l., Agrate Brianza (IT)

( * ) Notice: Subject to any disclaimer, the term of this patent is extended or adjusted under 35 U.S.C. 154(b) by 0 days.

(21) Appl. No.: 18/116,912

(22) Filed: Mar. 3, 2023

(65) Prior Publication Data
US 2023/0281142 A1 Sep. 7, 2023

(30) Foreign Application Priority Data
Mar. 3, 2022 (IT) .................. 102022000004055

(51) Int. Cl.
*G06F 13/38* (2006.01)
*G06F 13/42* (2006.01)
*H04L 25/02* (2006.01)

(52) U.S. Cl.
CPC ........ *G06F 13/385* (2013.01); *G06F 13/4291* (2013.01); *H04L 25/0262* (2013.01)

(58) Field of Classification Search
CPC . G06F 13/385; G06F 13/4291; H04L 25/0262
See application file for complete search history.

(56) References Cited

U.S. PATENT DOCUMENTS

| | | | | |
|---|---|---|---|---|
| 5,604,870 A | * | 2/1997 | Moss | G06F 13/105 |
| | | | | 710/52 |
| 5,649,122 A | * | 7/1997 | Wegner | G06F 13/385 |
| | | | | 710/29 |
| 5,661,751 A | * | 8/1997 | Johnson | G06F 1/3215 |
| | | | | 375/377 |
| 6,366,610 B1 | | 4/2002 | Loyer et al. | |
| 2004/0062331 A1 | | 4/2004 | Samuel | |
| 2011/0116557 A1 | * | 5/2011 | Agrawal | H04L 7/0331 |
| | | | | 375/259 |
| 2021/0096969 A1 | * | 4/2021 | Murphy | G06F 11/221 |

OTHER PUBLICATIONS

IT Search Report and Written Opinion for priority application, IT Appl. No. 102022000004055, report dated Sep. 28, 2022, 10 pgs.

* cited by examiner

*Primary Examiner* — Freshteh N Aghdam
(74) *Attorney, Agent, or Firm* — Crowe & Dunlevy LLC

(57) ABSTRACT

A UART communication interface manages transmission/reception at a baud rate using a baud-rate detection circuit. An edge detector detects edges in a reception signal and resets a count value in a digital counter circuit indicating a time between two consecutive edges. In the absence of a detected edge, the digital counter circuit increases the count value. At a newly detected edge, a validation circuit verifies the count value by asserting a second control signal when the count value is smaller than a maximum, and otherwise de-asserting the second control signal. A register provides a threshold signal by storing the count value when the second control signal is asserted. The threshold signal stored by the register is updated when the time is in a permitted range corresponding to the duration of a single bit. The baud rate may be determined as a function of the threshold signal.

14 Claims, 5 Drawing Sheets

PROCESSING SYSTEM, RELATED INTEGRATED CIRCUIT, SYSTEM AND METHOD

PRIORITY CLAIM

This application claims the priority benefit of Italian Application for Patent No. 102022000004055 filed on Mar. 3, 2022, the content of which is hereby incorporated by reference in its entirety to the maximum extent allowable by law.

TECHNICAL FIELD

Embodiments of the present disclosure relate to a microcontroller comprising a Universal Asynchronous Receiver-Transmitter (UART).

BACKGROUND

FIG. 1 shows a block diagram of a digital processing system 10, in particular a microcontroller.

In the example considered, the processing system 10 comprises a microprocessor (MP) 102, usually the Central Processing Unit (CPU), programmed via software instructions. Usually, the software executed by the microprocessor 102 is stored in a non-volatile program memory (Mem) 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data. The microprocessor 102 usually has associated also a volatile memory (Vmem) 104b, such as a Random-Access-Memory (RAM). For example, the memory 104b may be used to store temporary data. As shown in FIG. 2, usually the communication with the memories 104 and/or 104b is performed via one or more memory controllers (MC) 100. The memory controller(s) 100 may be integrated in the microprocessor 102 or connected to the microprocessor 102 via a communication channel, such as a system bus of the processing system 10. For example, the system bus may comprise one or more bus systems, e.g., based on the Advanced eXtensible Interface (AXI) bus architecture, and/or a Network-on-Chip (NoC). Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:
  one or more communication interfaces IF configured, for example, for exchanging data via a communication system 20, such as a Universal asynchronous receiver/transmitter (UART), Serial Peripheral Interface Bus (SPI), Inter-Integrated Circuit (I2C), Controller Area Network (CAN) bus, and/or Ethernet interface, and/or a debug interface; and/or
  one or more analog-to-digital converters AD and/or digital-to-analog converters DA; and/or
  one or more dedicated digital components DC, such as hardware timers and/or counters, or a cryptographic co-processor; and/or
  one or more analog components AC, such as comparators, sensors, such as a temperature sensor, etc.; and/or
  one or more mixed signal components MSC, such as a PWM (Pulse-Width Modulation) driver.

For example, for this purpose, the system bus may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

Various solutions are known for updating the firmware stored in the program memory 104. For example, in this context may be cited United States Patent Application No. US20200319876A1, which is incorporated herein by reference for this purpose.

For example, as shown in FIG. 2, the processing system 10 may receive a new firmware from a detachable program/diagnostic tool (T) 30, e.g., used in a service center, and/or another processing system (PS) 40. Generally, the program/diagnostic tool 30 and/or the processing system 40 may be connected to the processing system 10 to be updated in any suitable manner, such as a communication system 20.

For example, the processing system 40 may be configured to exchange data with one or more remote servers (RS) 50 via one or more wireless communication modules (WCM) 402. For example, such a processing system 40 is often used to provide status and/or diagnostic information to the server 50. According, the processing system 40 may also receive the new firmware for a given processing system 10 via the communication interface 402 from a remote server 50. For example, the communication interface 402 and the remote server(s) 50 may exchange data via the Internet.

For example, FIG. 3 shows an example of a firmware update procedure.

For example, the update procedure may be activated once the product incorporating the processing system 10 has been delivered. The update procedure may be handled by a dedicated hardware resource of the processing system and/or by a suitable programming of the processing unit 102. For example, when a dedicated hardware resource is used for the update process, the processing unit 102 may also be switched off during the update procedure. Conversely, when the processing unit 102 is used, the processing unit 102 execute a given firmware also containing the update function. Generally, this firmware may be directly the old firmware of the processing system 10, i.e., the old firmware contains instructions for implementing the update procedure. Alternatively, or in addition, the update function may be implemented in a separate firmware image, such as a separate system firmware. For example, once having received an update request, the processing system 10 may activate such a separate firmware image in order to handle the update request.

After a start in step 1000, the processing system 10 receives at step 1002 a new firmware via a communication interface of the processing systems 10 and stores at step 1006 the firmware received to the program memory 104 of the processing system.

For example, the program memory 104 is often split into a plurality of updateable firmware memory areas, e.g., two memory areas, wherein a respective firmware image may be stored to each updateable firmware memory area at the step 1006. For example, the old firmware (currently used by the processing system 10) may thus be stored to a first memory area, and the processing systems 10 is configured to store the new firmware received to a second memory area, i.e., without overwriting the old firmware.

Generally, before or after storing the firmware to the memory 104, the processing system 10 may validate at step 1004 the firmware received. For example, the processing system may receive an encrypted version of the firmware. In this case, the processing system 10 may validate the firmware by verifying whether (at least part of) the firmware received may be decrypted. Moreover, when transmitting an encrypted version of the firmware, the processing system 10 may either store the decrypted or encrypted version to the memory 104. For example, the encrypted version may be stored when the memory controller 100 of the memory 104 supports also a real-time decryption operating of the firmware read from the program memory 104.

In case the processing system 10 supports a plurality of firmware memory areas, once the firmware has been stored to the program memory 104 and optionally has been verified and/or validated, the processing system 10 may store at step 1008 firmware identification data to a non-volatile memory in order to indicate, which updateable firmware image should be used. Generally, this memory may be any non-volatile memory of the processing system 10, including the program memory 104 or a further non-volatile memory. Accordingly, in response to a certain event (e.g., a reset), at step 1010 the processing system 10 may read the firmware identification data, decide which updateable firmware image should be used and execute the respective firmware image.

Finally, the update procedure terminates at a stop in step 1012.

For example, in many processing systems 10 the firmware of the processing system 10 may be updated via a debug interface, such as a JTAG (Joint Test Action Group) interface, which, e.g., may be used to write directly data to the non-volatile memory 104.

Often, the communication system 20 is also based on an UART communication. For example, in this case, the processing system 10 may comprise an UART communication interface and the microprocessor 102 or a dedicated hardware circuit may be configured to receive the firmware via the UART communication interface. For example, in this respect these are also known UART-JTAG converter circuits configured to convert a communication exchanged via a UART into a communication used to interface a JTAG interface. Generally, such a UART-JTAG converter circuit may be integrated directly within the integrated circuit of the processing system 10 or within a separate integrated circuit, which is connected to a JTAG interface of the processing system 10, e.g., via traces of an integrated circuit board.

Generally, UART uses two separate signals: a transmission signal TX and a reception signal RX, i.e., an UART interface is configured to generate a transmission signal TX and receive a reception signal. Accordingly, two UART interfaces may exchange data by connecting the transmission signal TX of a first UART interface to the reception signal RX of the second UART interface. Similarly. the transmission signal TX of the second UART interface is connected to the reception signal RX of the first UART interface. Those of skill in the art will appreciate that UART may also be used in combination with additional transceivers, such as RS-232 (Recommended Standard 232) transceivers, which also may permit to implement bus systems, e.g., by using RS-485 (Recommended Standard 485), also known as TIA-485(-A) or EIA-485, transceivers.

Due to the fact that UART is a serial asynchronous transmission protocol, both the transmitter circuit, e.g., the circuit 30 or 40, and the receiver circuit, e.g., the circuit 10, use a given transmission speed in order to exchange an UART frame. Specifically, a typical UART interface is configured to send and receive fixed length UART frames comprising only a few data bits, such as 1 byte (8 bits) or 2 bytes (16 bits). A typical UART frame comprises moreover: —an initial start bit, which is set to "0" (low), used to indicate the start of a UART frame; —one or more final stop bits, which are set to "1" (high), used to indicate the end of a UART frame; and optionally, one or more parity bits between the data and stop bits.

For example, a descriptor of the operation mode 8N1 indicates eight data bits (8), no parity (N) and one (1) stop bit are transmitted or received. Accordingly, UART frames have a fixed length of bits, e.g., 10 bits for the format 8N1 (including the start bits)

The communication via such an UART interface is usually a low speed communication. For example, typically supported baud rates are 9600, 14400, 19200, 38400, 57600 bits/s. This applies, in particular, when long cables are used for the UART communication between the processing system 10 and the detachable program tool 30 or the processing system 40, because such cables are affected by parasitic capacitances and inductances. For example, the UART interface may be configured to use a fixed or predetermined baud rate. However, in this case, the transmission speed is usually not optimized for the current application scenario, e.g., because a higher baud rate could be used when the cable is shorter. Accordingly, solutions have been proposed, e.g., in the context of modems, which permit to negotiate a baud rate between a transmitting UART interface and a receiving UART interface, e.g., by determining a maximum baud rate, which still permits to reliable data transmission. However, especially in case of longer cables and hazardous environments, the parasitic capacitances and inductances may change, which thus implies that the initial conditions may not be valid anymore. Accordingly, in such a scenario, the data may not be transmitted reliably, which, e.g., may be particularly critical during a firmware update process.

In view of the above, there is a need in the art to provide more robust solutions for adjusting the baud rate used for the transmission of data between an UART transmitter and an UART receiver.

SUMMARY

One or more embodiments concern a processing system. Embodiments moreover concern a related integrated circuit, system and method.

As mentioned before, various embodiments of the present disclosure relate to a processing system able to automatically adjust the baud rate of an UART communication. Specifically, the processing system comprises a transmission terminal configured to provide a transmission signal, a reception terminal configured to receive a reception signal and an UART communication interface. In various embodiments, the UART communication interface comprises a clock management circuit configured to receive a clock signal and generate a down-scaled clock signal as a function of a clock scaling factor. A transmission circuit of the UART communication interface is configured to sequentially transmit, in response to the down-scaled clock signal, and via the transmission signal, a given number of bits stored to a transmission data register of the UART communication interface. Similarly, a reception circuit is configured to sequentially receive, in response to the down-scaled clock signal, and via the reception signal a given number of bits and store the received bits to a reception data register of the UART communication interface.

In various embodiments, the processing system comprises also a baud-rate detection circuit. Specifically, in various embodiments, the baud-rate detection circuit comprises a further clock management circuit, an edge detector, a digital counter circuit, a validation circuit and a register.

Specifically, the further clock management circuit is configured to receive the clock signal and generate a further clock signal. The edge detector is configured to generate a first control signal indicating rising and falling edges in the reception signal. The digital counter circuit is configured to monitor the first control signal, and in response to determining that the first control signal signals an edge in the reception signal, reset a count value. Conversely, in response to determining that the first control signal does not signal an edge in the reception signal, the digital counter increases the count value.

In various embodiments, the validation circuit is configured to monitor the first control signal and the count value. In response to determining that the first control signal signals an edge in the reception signal and when the count value is smaller than a maximum value, the validation circuit asserts a second control signal. Conversely, in response to determining that the first control signal does not signal an edge in the reception signal or when the count value is equal to or greater than the maximum value, the validation circuit de-asserts the second control signal.

Specifically, the register is configured to provide a threshold signal by storing the count value when the second control signal is asserted, wherein the clock scaling factor is derived from the threshold signal.

For example, in various embodiments, the clock management circuit comprises a first down-scaling circuit configured to generate the down-scaled clock signal via a first counter configured to increase a first count value in response to the clock signal until the first count value reaches a first threshold value. In this case, the first threshold value may correspond to the threshold signal stored to the register.

Conversely, in other embodiments, the first down-scaling circuit is configured to generate a pre-scaled clock signal and the clock management circuit comprises also a second down-scaling circuit configured to receive the pre-scaled clock signal and generate the down-scaled clock signal as a function of a second clock scaling factor. In this case, the first threshold value of the first down-scaling circuit may be derived from the threshold signal, or the further clock management circuit may comprise a third down-scaling circuit configured to receive the clock signal and generate the further clock signal as a function of the second clock scaling factor.

Accordingly, in various embodiments, the baud rate of the UART communication interface, in particularly the frequency of the down-scaled clock signal used by the transmission circuit and the reception circuit, is determined via the threshold signal stored to the register, wherein the register is updated when the time between two consecutive edges of the reception signal is validated by the validation circuit.

As will be described in greater detail in the following, in various embodiments, the maximum value (indicating a minimum permitted baud rate) may be selected in a range between a nominal count value and a double of the nominal count value, or may correspond to the double of the nominal count value. In various embodiments, the nominal count value may be fixed or predetermined, or the nominal count value may correspond to the threshold signal, i.e., the baud-rate detection circuit may adjust the maximum value as a function of the threshold signal stored to the register.

In various embodiments, the validation circuit may also be configured to assert the second control signal only when the count value is also greater than a minimum value (indicating a maximum permitted baud rate). As will be described in greater detail in the following, in various embodiments, the minimum value may be selected in a range between the nominal count value and half of the nominal count value, or may correspond to half of the nominal count value. Accordingly, also in this case, when the nominal count value corresponds to the threshold signal, the baud-rate detection circuit may be configured to adjust the minimum value as a function of the threshold signal.

For example, as described in the foregoing, the UART communication interface may be used to receive data comprising a firmware update for a microcontroller. In this case, the processing system comprises thus also a microprocessor configured to execute software instructions, a non-volatile memory configured to store the software instructions, and a debug interface, such as a JTAG interface, configured to analyze the content of the reception data register in order to determine one or more debug command packets used to write new software instructions to the non-volatile memory. Preferably, the debug interface is configured to store, in response to each debug command packet, a respective debug response packet to the transmission data register, thereby also signaling the correct reception of a debug command packet.

Accordingly, in various embodiments, an UART transmitter circuit may be configured to sequentially transmit according to a given baud rate data (e.g., comprising a firmware) via the reception signal to the processing system, whereby the UART communication interface of the processing system automatically sets the frequency of the down-scaled clock signal used by the transmission circuit and the reception circuit, when the data are received. Moreover, the UART transmitter circuit may be configured to vary the baud rate during the transmission of the data, e.g., reduce the baud rate when the UART transmitter circuit does not receive the response packet from the processing system.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
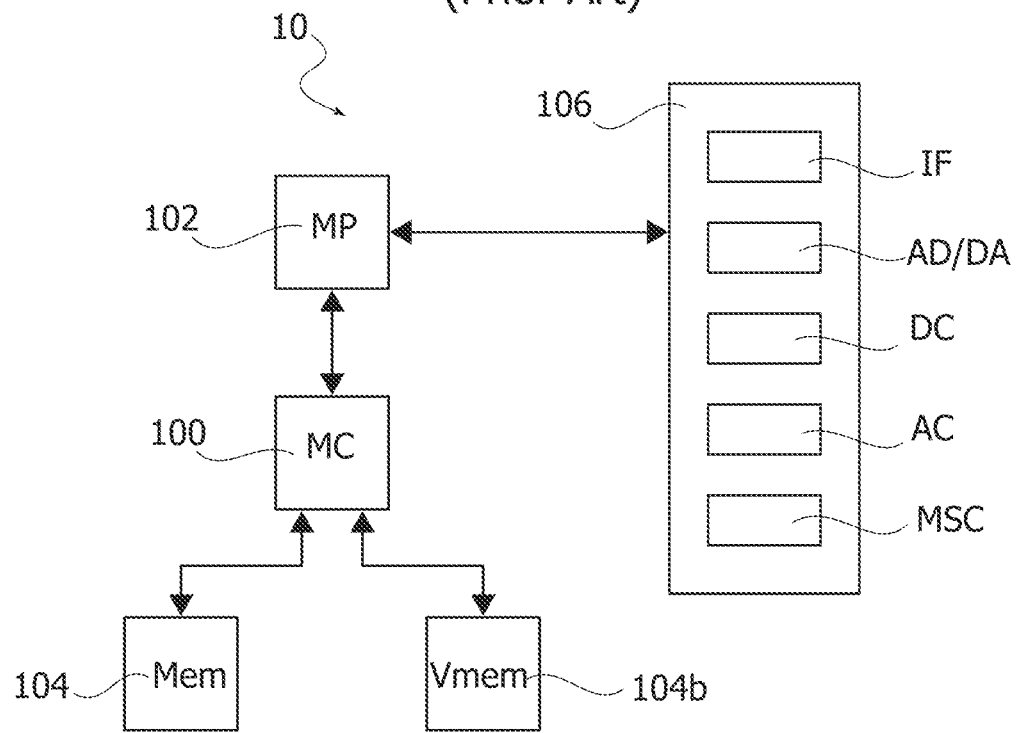
FIG. 1 shows an example of a processing system.
Figure 2:
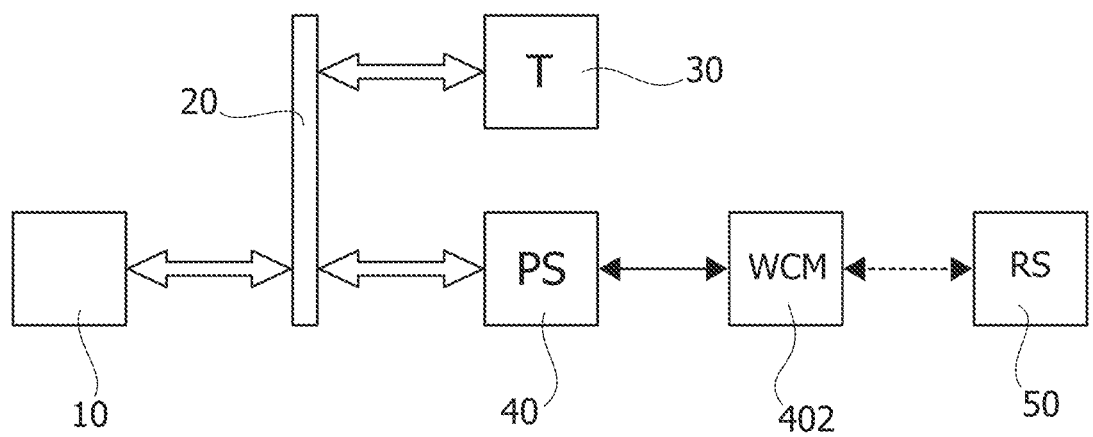
FIG. 2 shows an example of system used to update the firmware of the processing system of FIG. 1.
Figure 3:
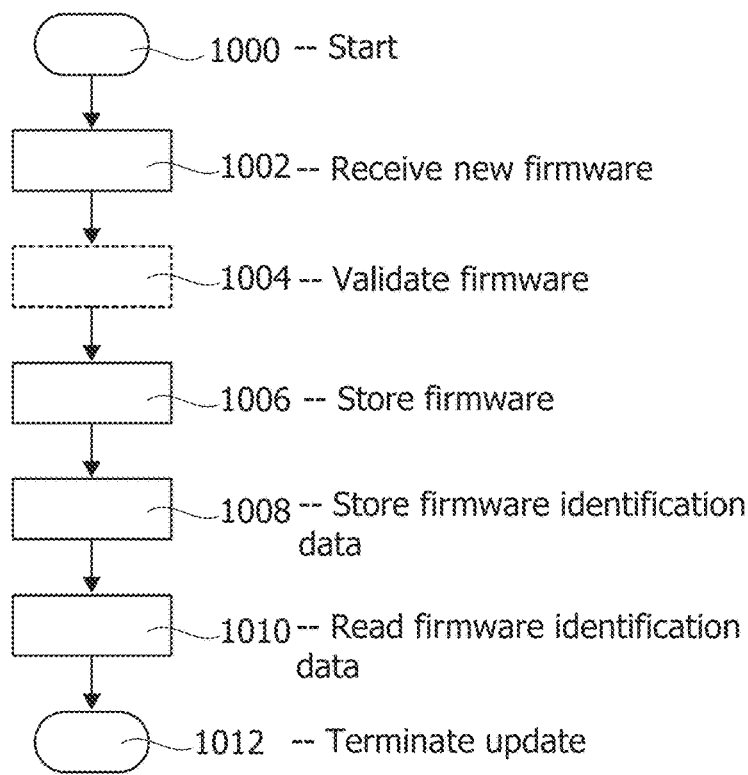
FIG. 3 shows an example of a method used to update the firmware of the processing system of FIG. 1.

In the following FIG. 4 to 8 parts, elements or components which have already been described with reference to FIGS. 1 to 3 are denoted by the same references previously used in such Figure; the description of such previously described elements will not be repeated in the following in order not to overburden the present detailed description.

Figure 4:
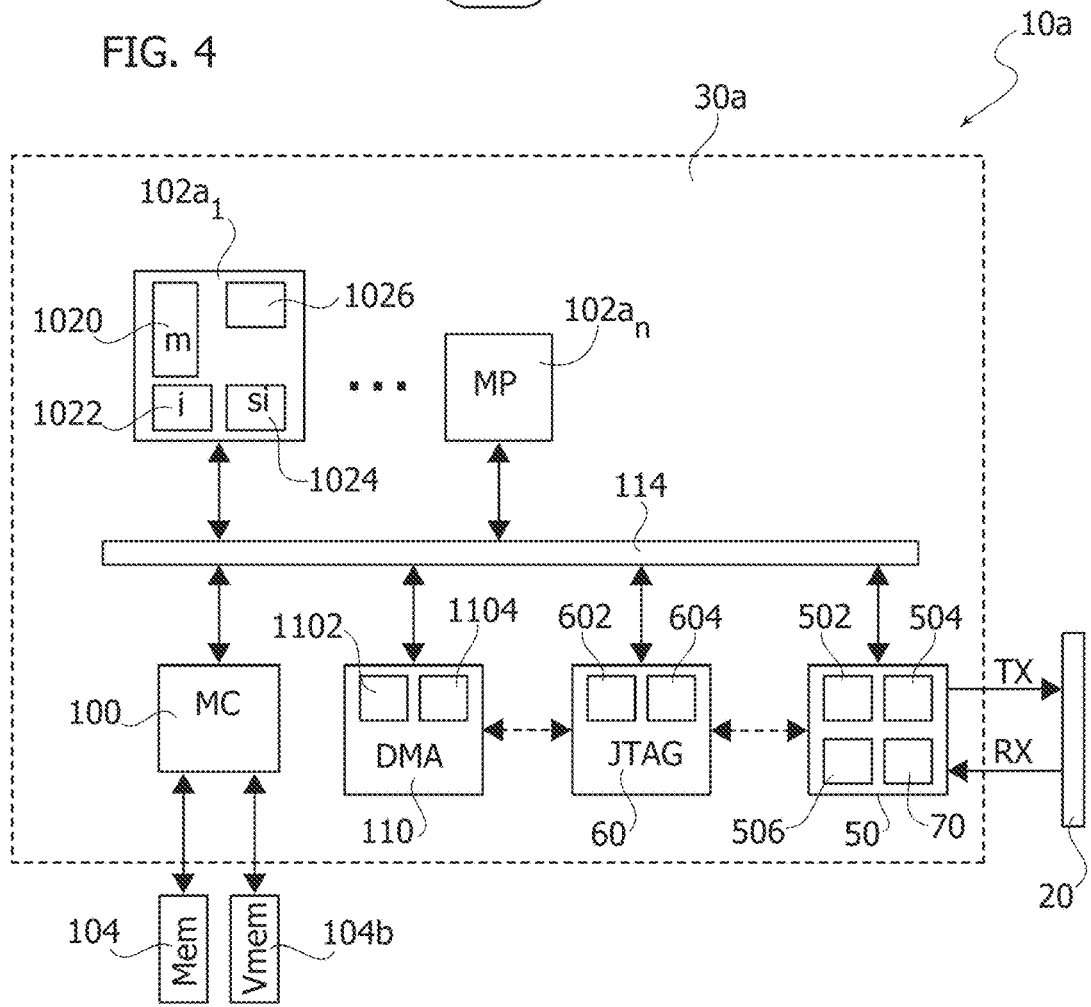
FIG. 4 shows an embodiment of a processing system according to the present disclosure.

FIG. 4 shows an embodiment of a processing system 10a in accordance with the present description.

Specifically, in the embodiment considered, the processing system 10a comprises at least one processing core 102a, such as n processing cores (MP) $102a_1, \ldots, 102a_n$, connected to a (on-chip) communication system 114. For example, in the context of real-time control systems, the processing cores $102a_1, \ldots, 102a_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core $102a_1$, each processing core 102a may comprise a microprocessor (m) 1020 and a communication interface (i) 1022 configured to manage the communication between the microprocessor 1020 and the communication system 114. In the embodiment considered, the interface 1022 is a master interface configured to forward a (read or write) request from the microprocessor 1020 to the communication system 114, and forward an optional response from the communication system 114 to the microprocessor 1020. In various embodiments, the processing core 102a may also comprise a slave interface (si) 1024. For example, in this way, a first microprocessor 1020 may send a request to a second microprocessor 1020 (via the communication interface 1022 of the first microprocessor, the communication system 114 and the communication interface 1024 of the second microprocessor). For example, for this purpose the communication system 114 may comprise in addition to a system bus or NoC, also an additional co-processor bus, e.g., connecting the microprocessors 1020 of the same processing core 102a or all processing cores 102a.

In various embodiments, each processing core $102a_1, \ldots, 102a_n$ may also comprise further local resources, such as one or more local memories 1026, usually identified as Tightly Coupled Memory (TCM).

As mentioned before, typically the processing cores $102a_1, \ldots, 102a_n$ are arranged to exchange data with a non-volatile memory 104 and/or a volatile memory 104b. In various embodiments, these memories are system memories, i.e., shared for the processing cores $102a_1, \ldots, 102a_n$. For example, in various embodiments, the processing system 10a comprises one or more memory controllers 100 configured to connect at least one non-volatile memory 104 and at least one volatile memory 104b to the communication system 114. As mentioned before, one or more of the memories 104 and/or 104b may be integrated in an integrated circuit 30a comprising the processing core(s) 102a or may be connected externally to the integrated circuit 30a. For example, the non-volatile memory 104 may be used to store the firmware of one or more of the microprocessors 1020.

As mentioned before, the processing system 10a may comprise one or more resources 106, such as one or more communication interfaces or co-processors (e.g., a cryptographic co-processor). Specifically, in the embodiment considered, the processing system 10a comprises a UART communication interface 50, which is preferably connected to the communication system 114 via a slave communication interface 504, such as a peripheral bridge.

In the embodiment considered, the UART communication interface 50 comprises a hardware transmission and reception interface circuit 506 configured to interface a UART communication channel by generating a transmission signal TX and receiving a reception signal RX. In order to manage the communication, the UART communication interface 50 may also comprise one or more transmission data registers DATATX for storing data to be transmitted, one or more control registers CTRL for storing control data, and one or more reception data registers DATARX for storing data having been received. In various embodiments, the same registers may be used as transmission data registers DATATX and reception data registers DATARX.

Accordingly, the slave interface 504 may be used to interface these registers with the communication system 114. For example, a processing core 102a may be configured to send one or more of the following requests via the communication system 114 to the slave interface 504 of the communication interface 50:

a write request in order to write data to the transmission data register(s) DATATX;

a write request in order to write data to the control register(s) CTRL, e.g., in order to configure the communication interface 50 and/or to start the data transmission operation; and a read request in order to read data from the reception data register(s) DATARX.

For example, for this purpose, each of the registers DATATX, DATARX and CTRL may have associated a respective physical address (PA) of the communication system 114, and each read or write request may comprise a given target address. For example, as mentioned before, the communication system 114 may comprise an Advanced Microcontroller Bus Architecture (AMBA) High-performance Bus (AHB), and an Advanced Peripheral Bus (APB) used to connect the communication interface 50 to the AMBA AHB bus.

Generally, the UART interface 50 may also comprise a master interface 502, often also identified as integrated Direct-Memory-Access (DMA) controller. For example, such a master interface 502 may be useful in case the UART interface 50 has to start a communication in order to exchange data via (read and/or write) request with another circuit connected to the communication system 114, such as a memory 104/104b, a resource 106 or a processing core 102. For example, in this way, the master interface/DMA controller 502 may be configured to generate write requests in order to store data received via the reception signal RX to the non-volatile memory 104, thereby storing a new firmware to the program memory 104.

FIG. 4 also shows an optional debug interface 60, such as a JTAG interface. Such a debug interface 60 may be configured to read data from or write to one or more registers or memory locations of the processing system 10a. For this purpose, the debug interface 60 may comprise a master interface 602 configured to send read or write requests to the communication system 114 and/or an additional dedicated debug communication system. Optionally, the debug interface 60 may also comprise a slave interface 604, which may be used, e.g., in order to program/configure whether the access to one or more of the registers and/or memory locations via the debug interface 60 is permitted or inhibited.

Accordingly, in various embodiments, instead of directly sending data to the memory 104, the UART interface 50 may be configured to exchange data with the debug interface 60, which in turn may be configured to store data to the non-volatile memory 104. For example, such an arrangement is usually preferable, because in this way the debug interface 60 may manage different debug commands and/or access protections may be implemented, which do not permit that the UART interface may directly store data to the memory 104, but the debug interface 60 may update the firmware, e.g., when the protections are disabled, or when the protections are enabled and given commands are provided to unlock the protection, e.g., by providing a password via a debug command received via the UART interface 50.

For example, such an UART/JTAG interface is disclosed in Italian Patent Application No. 102021000008840, which is incorporated herein by reference for this purpose.

For example, in various embodiments, the debug interface 60 is configured to receive a debug command packet and optionally one or more debug data packets.

For example, in various embodiments, a debug data packet has a dimension corresponding to the word size of the processing system 10a, such as 1, 2, 4 or 8 bytes, e.g., 4 bytes in case of a 32-bit microprocessor 1020.

Conversely, a debug command packet has typically a plurality of bytes, such as 2, 4 or 8 bytes, in order to indicate a debug command. For example, the debug command packet may indicate a read request or a write request, wherein one or more following debug data packets comprise the respective data. Generally, the data of a write request may also be included directly in the debug command packet, which thus could have a variable size.

In various embodiments, the debug interface 60 may thus also be configured to provide a debug (response) data packet to the UART interface 50 to be transmitted via the transmission signal TX.

In various embodiments, the debug interface 60 may also generate a debug response packet, which, e.g., may be transmitted in response to each debug command packet in order to provide a respective status response, e.g., indicating whether the data included in a write request have been stored to the respective address. For example, the debug response packet may have 1 or 2 bytes. Generally, the data of a read request may also be included directly in the debug response packet, which thus could have a variable size.

In various embodiments, the debug command packet, the debug data packet and the debug response packet are exchanged with the UART communication interface 50, e.g., by reading data from the previously mentioned register DATARX and writing data to the previously mentioned register DATATX. Generally, the data exchange between the UART interface 50 and the debug interface 60 may be implemented in any suitable manner, such as via a direct connection, the master interface 502, and/or the master interface 602.

In various embodiments, the UART interface is thus configured to exchange the respective data via UART frames with the communication channel 20, e.g., by transmitting the debug response packet or an optional debug data packet by transmitting one or more UART frames via the transmission signal TX and/or receiving a debug command packet or an optional debug data packet by receiving one or more UART frames via the reception signal RX. For example, in various embodiments, each UART frame has 8 data bits, e.g., by using a frame format 8N1. For example, in various embodiments, by using debug commands with 16 bits and UART frames with 8 data bits, each debug command packet would be received via two consecutive UART frames. Conversely, by using debug response packets with 8 bits, each debug command packet would be transmitted via a single UART frames.

Often such processing systems 10a also comprise one or more general-purpose Direct-Memory-Access (DMA) controllers 110. Generally, a general-purpose DMA controller 110 may comprises at least one functional channel connected to a resource 106, such as the UART interface 50 and/or the debug interface 60. Often the resource 106 associated with a given channel may also be selected as a function of configuration data. Specifically, a channel is either a read or write channel (which also may programmable) and has typically associated configuration data, which indicate the memory address-range from which the DMA controller 110 should read data or the memory address-range to which the DMA controller 110 should write data. For example, in this way, a resource 106 may be connected to the DMA controller 110 via two channels:
  a read channel configured to autonomously read data from a first memory range and provide the data having been read to the resource 106 (e.g., in order to transmits the respective data); and
  a write channel configured to receive data from the resource 106 (e.g., data having been received) and autonomously write these data to a second memory range.

Accordingly, a general-purpose DMA controller 110 typically has associate a master interface 1102 for transmitting the read or write requests to the memory controller 100. Generally, for this purpose, the master interface 1102 may be connected via a dedicated DMA channel directly to the memory controller 110 or the master interface 1102 may send the requests to the communication system 114. For example, in the latter case, the read and write requests may comprise any address managed by the communication system 114. Similarly, instead of interfacing directly a resource 106 via a dedicated channel, a general-purpose DMA controller 110 may also be configured to exchange the data with the resource 106 via the communication system 114. For example, in the case, the DMA controller 110 may be configured to send via the master interface 1102 first a read request comprising a first address and then a write request comprising a second address.

Accordingly, in various embodiments, a general-purpose DMA controller 110 may be used instead of the master interfaces 502 and/or 602. Moreover, typically a general-purpose DMA controller 110 comprises also a slave interface 1104 for receiving configuration data for configuring the DMA controller 110.

Figure 5:
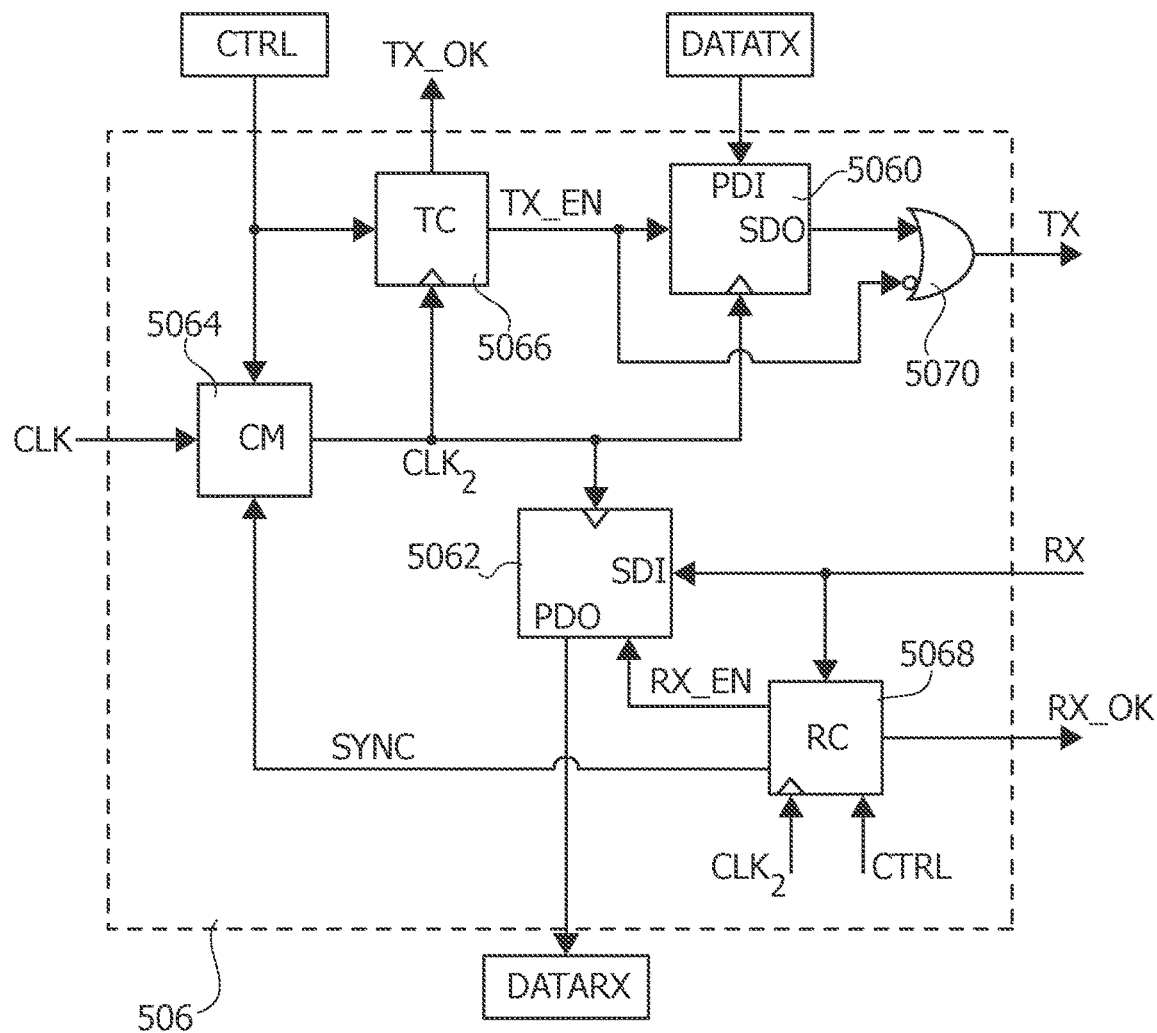
FIGS. 5, 6 and 7 show embodiments UART interfaces for the processing system of FIG. 4.

FIG. 5 shows an embodiment of a hardware serial communication interface 506 of the UART interface 50.

Specifically, in the embodiment considered, the hardware communication interface 506 comprises two shift registers 5060 and 5062. Specifically, in the embodiment considered, the shift register 5060 is used to store the data to be transmitted. Accordingly, once a data transmission is requested, the hardware communication interface 506 may transfer the content of the transmission data registers DATATX to the shift register 5060, e.g., by using a parallel data input PDI of the shift register 5060. For this purpose, the transmission data register DATATX and the shift-register 5060 preferably have the same dimension and are configured to store the data bits and the optional parity bits of one UART frame, such as 1 byte. Generally, the UART frame stored to the transmission data register DATATX may comprise or not comprise the start bit of the UART frame. For example, in this case, a first bit of the shift-register 5060 may be set to "0", while the other bits of the shift-register 5060 are mapped to respective bits of the transmission data register DATATX. Similarly, the transmission data register DATATX may comprise or not comprise the one or more stop bits of the UART frame. Moreover, in various embodiments, the data register DATATX and the shift-register 5060 may be implemented with the same shift-register, which may be written, e.g., via the slave interface 504 and/or a DMA channel (circuits 502, 602 and/or 110).

In various embodiments, the shift register 5060 is configured to sequentially transmit the bits stored to the shift register 5060 as a function of a clock signal $CLK_2$ and a transmission enable signal TX_EN. Specifically, in the embodiment considered, the hardware communication interface 506 comprises also a clock management circuit (CM) 5064 configured to generate the clock signal $CLK_2$ for the hardware communication interface 506 in response to a system clock signal CLK of the processing system 10$a$.

Figure 6:
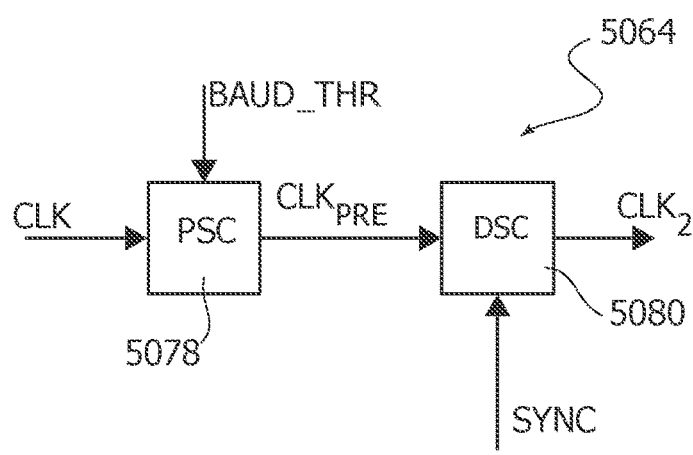

For example, as shown in FIG. 6, in various embodiments, the clock management circuit may comprise a clock pre-scaling circuit (PSC) 5078 configured to generate a pre-scaled clock signal $CLK_{PRE}$ having a reduced frequency with respect to the frequency of the clock signal CLK, wherein the scaling factor may be programmable as a function of the configuration data stored to the control register(s) CTRL. For example, the pre-scaling circuit 5078 may be implemented with a counter configured to increase a count value in response to the clock signal CLK, wherein the counter changes the logic level of the clock signal $CLK_{PRE}$ when the count value reaches a threshold value BAUD_THR, wherein the threshold value BAUD_THR is determined as a function of the configuration data provided by the control register(s) CTRL.

In various embodiments, the pre-scaled clock signal $CLK_{PRE}$ is then provided to a further and optional down-scaling circuit (DSC) 5080 configured to generate the clock signal $CLK_2$ having a reduced frequency with respect to the frequency of the clock signal $CLK_{PRE}$, wherein the scaling factor may be fixed or programmable as a function of the configuration data stored to the control register(s) CTRL. For example, the down-scaling circuit 5080 may be implemented with a counter configured to increase a count value in response to the clock signal $CLK_{PRE}$, wherein the counter changes the logic level of the clock signal $CLK_{PRE}$ when the count value reaches a threshold value, wherein the threshold value is optionally determined as a function of the configuration data provided by the configuration register(s) CTRL.

As shown in FIG. 5, in various embodiments, the operation of the down-scaling circuit 5080 is changed in response to a synchronization signal SYNC, which is however only used when receiving data and will be described herein.

Accordingly, when transmitting data, the clock signal $CLK_2$ corresponds to a down-scaled version of the clock signal CLK (as a function of the threshold BAUD_THR).

As mentioned before, the shift register 5060 also receives an enable signal TX_EN, which enables the data transmission operation. Specifically, in the embodiment considered, the shift register 5060 is configured to, when the enable signal TX_EN is asserted and in response to the clock signal $CLK_2$, sequentially provide at a serial data output SDO the content of the shift-register 5060. Accordingly, when the enable signal TX_EN is asserted, the shift register 5060 sequentially provides the bits of the data stored to the shift register 5060. In the embodiment considered, the enable signal TX_EN is generated by a transmission control circuit (TC) 5066 configured to determine whether a given number of requested bits has been transmitted. For example, the number of bits may be fixed or determined as a function of the UART frame format. For example, as mentioned before, the number of bits may correspond to for the format 8N1. However, in various embodiments, the transmission control circuit 5066 may also be configured to determine the number of requests bits to be transmitted as a function of the configuration data stored to the control register(s) CTRL, which, e.g., may indicate the number of parity bits and/or stop bits.

For example, in various embodiments, the transmission control circuit 5066 may comprise a counter, which is increased in response to the clock signal $CLK_2$, thereby indicating the number of transmitted bits. Accordingly, the counter may be reset when starting a new data transmission operation, thereby asserting the enable signal TX_EN, and the transmission control circuit 5066 de-asserts the enable signal TX_EN when the requested number of bits has been transmitted. For example, in this case, the transmission control circuit may assert a control/interrupt signal TX_OK when the transmission control circuit 5066 de-asserts the enable signal TX_EN.

In various embodiments, the hardware communication interface 506 comprises a combinational logic circuit 5070 configured to set the signal TX to high, when the enable signal TX_EN is de-asserted. For example, in case the enable signal TX_EN is set to low when the enable signal TX_EN is de-asserted, the combinational logic circuit 5070 may be implemented with a logic OR gate receiving at input the serial data output signal SDO of the shift register 5076 and the inverted version of the enable signal TX_EN, and providing at output the signal TX. The combinational logic circuit 5070 is purely optional, because the serial data output signal SDO may also be set to high, when the enable signal TX_EN is de-asserted, e.g., because a stop bit is stored to the register 5060.

Conversely, the shift register 5062 is configured to store the bits received via the signal RX. Specifically, when no data transmission occurs, the reception signal RX is set to high. Once a transmission is started by another device, the start bit is transmitted, whereby the reception signal RX is set to low. Accordingly, in various embodiments, the hardware communication interface 506 comprises a reception control circuit (RC) 5068. Specifically, the reception control circuit 5068 is configured to assert a reception enable signal RX_EN in response to a change of the signal RX from high to low, e.g., in response to a falling edge of the signal RX.

Similar to the transmission control circuit 5066, also the reception control circuit 5068 may use a counter, which is reset in response to detecting the start bit and increased in response to the clock signal $CLK_2$, wherein the reception control circuit 5068 de-asserts the enable signal RX_EN when the requested number of bits has been received. In various embodiments, the reception control circuit may assert a control/interrupt signal RX_OK when the reception control circuit 5068 de-asserts the enable signal RX_EN.

Accordingly, in various embodiments, the shift register 5062 is configured to, when the enable signal RX_EN is asserted and in response to the clock signal $CLK_2$, sequentially add to the data stored to the shift register 5062 the logic level applied to a serial data input SDI of the shift register 5062, wherein the serial data input SDI is connected to the reception signal RX. Generally, the reception control circuit 5068 may assert the reception enable signal RX_EN with the start bit or only for the next bit, whereby the start bit is stored or not stored to the shift register 5062.

Moreover, once the given number of bits have been received, e.g., in response to the signal RX_OK, the hardware communication interface 506 transfers the content of the shift register 5062 to the reception data register DATARX, e.g., by using a parallel data output PDO of the shift register 5062. For this purpose, the reception data register DATARX and the shift-register 5062 have preferably the same dimension. Moreover, in various embodiments, the data register DATARX and the shift-register 5062 may be implemented with the same shift-register, which may be read, e.g., via the slave interface 504 and/or a DMA channel (circuits 502, 602 and/or 110).

Figure 7:
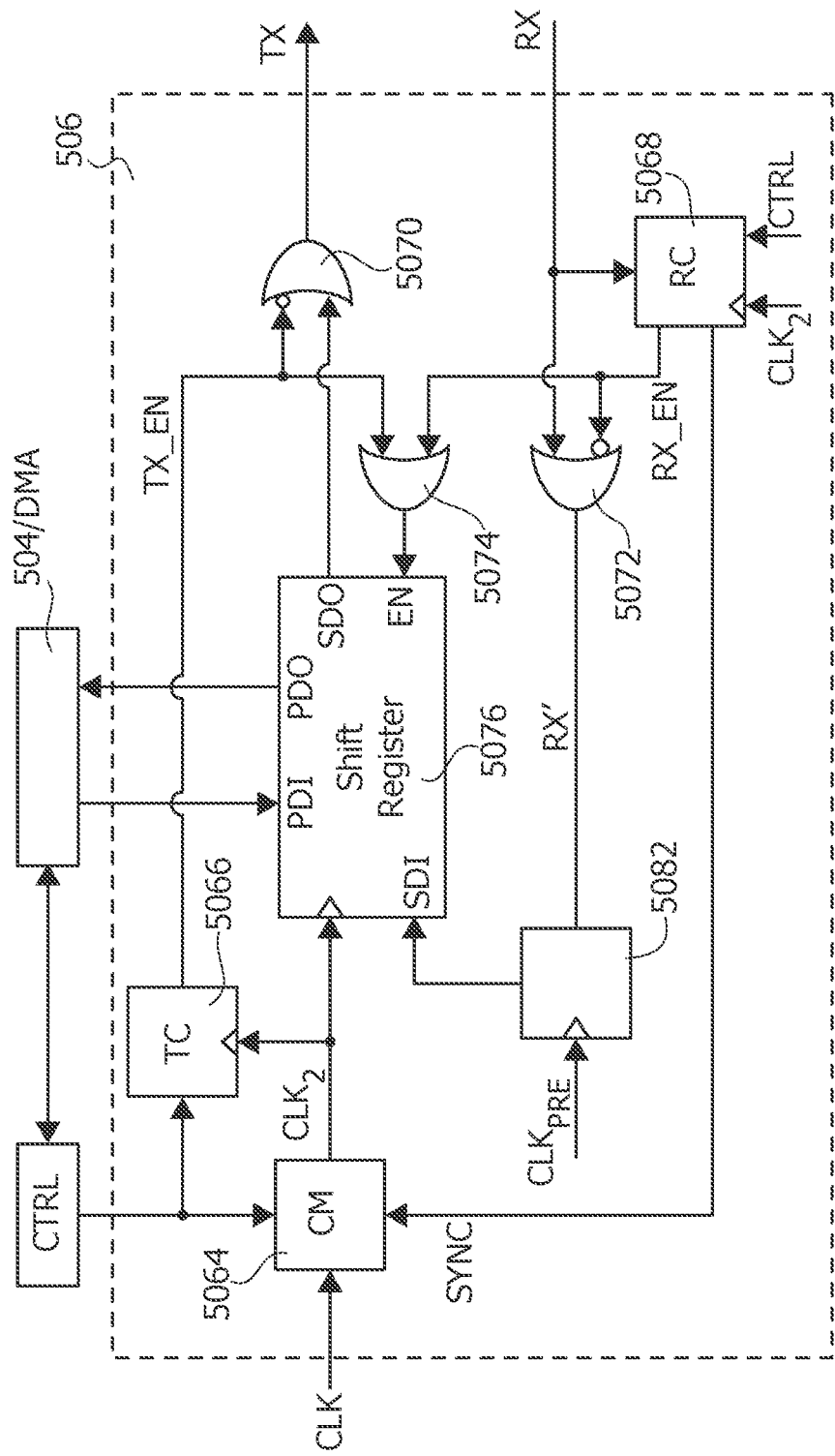

FIG. 7 shows in this respect a modified hardware communication interface 506, which comprises only a single shift register 5076. Accordingly, in the following will only be evidenced the differences with respect to FIG. 5.

Specifically, in the embodiment considered, the shift register 5076 is configured to, when an enable signal EN is asserted, sequentially shift the content of the shift register 5076 in response to the clock signal $CLK_2$, wherein a first bit is provided via a serial data output SDO of the shift register 5076 and a second bit received via a serial data input SDI of the shift register 5076 is added to the content of the shift register 5076.

Accordingly, in this case, the serial data output SDO may be connected to the transmission signal TX, or preferably to the logic gate 5070. Conversely, the serial data input SDI may be connected to the reception signal RX through circuit 5082.

In various embodiments, the serial data input SDI may be connected to an additional logic gate 5072, which sets a signal RX' provided to the serial data input SDI to high, when the reception enable signal RX_EN is set to low. For example, in various embodiments, the logic gate 5072 is an OR gate receiving at input the reception signal RX and the inverted version of the reception enable signal RX_EN. Generally, the logic gate 5072 may also be used in the arrangement of FIG. 5.

Specifically, in the embodiment considered, the enable signal EN of the shift register 5076 is asserted when either the transmission enable signal TX_EN or the reception enable signal RX_EN is asserted. For example, for this purpose, the hardware communication interface 506 comprises a logic gate 5074, such as an OR gate, configured to generate the enable signal EN by combining the transmission enable signal TX_EN and the reception enable signal RX_EN.

Accordingly, also in this case, the transmission frame (with or without the start bit) may be transferred to the shift register 5076, either directly or indirectly via the transmission data register DATATX, e.g., by using a parallel data input PDI of the shift register 5076. Similarly, the reception frame (with or without the start bit) may be transferred from the shift register 5076, either directly or indirectly via the reception data register DATARX, e.g., by using a parallel data output PDO of the shift register 5076.

Accordingly, in the embodiments considered, the transmission of data occurs in response to the clock signal $CLK_2$, and the data are shifted out synchronously with this clock $CLK_2$. Conversely, the data received via the reception signal RX may have a phase and/or a frequency deviation from this clock $CLK_2$. Substantially, a frequency deviation leads to accumulated phase shifts, i.e., a frequency deviation can be viewed as a sequence of phase shifts. In various embodiments, to compensate phase shifts the reception control circuit 5068 may be configured to adjust the sampling point of the received data based on detected bit transitions. Specifically, in various embodiments, is used for this purpose the synchronization signal SYNC.

Specifically, in various embodiments, the reception control circuit 5068 is configured to assert the synchronization signal SYNC in response to detecting a change of the logic level of the reception signal RX, i.e., in response to a falling edge and/or a rising edge of the signal RX. For example, for this purpose, the reception control circuit 5068 may sample the reception signal RX in response to the clock signal $CLK_{PRE}$ and assert the synchronization signal SYNC when a current sample is set to high and the previous sample is set to low and/or when a current sample is set to the low and the previous sample is set to high.

As mentioned with respect to FIGS. 5 and 6, the down-scaling circuit 5080 may be synchronized with the synchronization signal SYNC in order to generate the edge used to sample the reception signal RX. For example, in various embodiments, the down-scaling circuit 5080 is implemented with a counter configured to increase a count value CNT, and reset the count value CNT when a maximum count value is reached. Moreover, in order to synchronize the count value CNT with the synchronization signal SYNC, the counter CNT may be reset in response to determining that the synchronization signal SYNC is asserted.

Generally, instead of resetting the counter 5080, the logic level of the synchronization signal SYNC may be used to determine the increase value of the counter. For example, by default the increase value may be set to 1. Conversely, when the signal SYNC is asserted when the count value is set to 0, the increase value of the counter may be set to zero, whereby the phase "0" is repeated twice. Conversely, when the signal SYNC is asserted when the count value has its maximum value minus 1 (e.g., 3), the increase value of the counter may be set to two, whereby the counter is reset indirectly.

As shown in FIG. 7, the clock signal $CLK_{PRE}$ (or another clock signal) may also be used to perform an oversampling of the received signal RX (or RX'). For example, in the embodiment considered, the hardware communication interface 506 comprises an oversampling circuit 5082, e.g., comprising a shift register having a plurality of bits, wherein the oversampling circuit 5082 stores a plurality of subsequent values of the reception signal RX (or RX'), and then generates the signal provided to the serial data input SDI of the register 5076 (or similarly the register 5062) based on the stored values. For example, in various embodiments, the oversampling circuit 5082 stores an odd number of bits, such as three, and the signal provided to the serial data input SDI of the register 5076 is corresponds to the logic value of the majority of bits.

Accordingly, in the previous embodiments, the data transmission rate is defined via the threshold/signal BAUD_THR which specifies the threshold for the clock down-scaling circuit 5078. For example, by setting the value of the signal BAUD_THR, the UART interface may use a clock signal $CLK_2$ with 9600 Hz.

As mentioned before, in various embodiments two circuits connected via respective UART interfaces are configured to determine an optimized baud rate.

Generally, solutions are known, wherein two UART transceivers automatically negotiate a baud rate. For example, document Chuck Farrow, Application Report "Automatic Baud Rate Detection on the MSP430", Texas Instruments, SLAA215, October 2004 (incorporated herein by reference), discloses a solution wherein the transmitter circuit transmits one or more predetermined symbols with a given requested baud rate, and the microcontroller samples the received bits in order to determine the baud rate used to transmit the one or more symbols. Substantially, in this case a given maximum baud MAX_BAUDRATE rate is supported, and the receiver circuit uses this frequency in order to (over) sample the received symbol, wherein the received bit sequence indicates whether the symbol has been transmitted with a baud rate BAUDRATE corresponding to a fraction of the maximum baud MAX_BAUDRATE rate. For example, when the transmitter circuit transmits the symbol 0x0d (plus the additional start bit) with a maximum supported baud rate MAX_BAUDRATE of 115,200 Baud, the microcontroller may sample the reception signal RX with 115,200 Hz and select the following baud rate:

115,200 Baud, when the received bit sequence corresponds to 0x0d;
57,600 Baud, when the received bit sequence corresponds to 0xe6;
38,400 Baud, when the received bit sequence corresponds to 0x1c;
19,200 Baud, when the received bit sequence corresponds to xe0; or
14,400 Baud, when the received bit sequence corresponds to 0x80.

It has been observed that such solutions for negotiating automatically a baud rate via predetermined symbols (essentially representing predetermined synchronization preambles) have several inconveniences. First of all, only given predetermined and fixed baud rates are supported. Moreover, the baud rate is only negotiated during the start of the data transfer and remains then fixed. For example, this implies that the communication may be lost in noisy environments, e.g., because the initial baud rate cannot be maintained anymore. Similarly, when the noise is reduced, the baud rate will not be increase during the communication, even though higher baud rates could be used.

As shown in FIG. 4, in various embodiments, the UART interface 50 comprises or at least has associated a baud rate detection circuit 70 configured to set the frequency of the clock signal $CLK_2$ of the hardware transmission and reception interface circuit 506.

Figure 8:
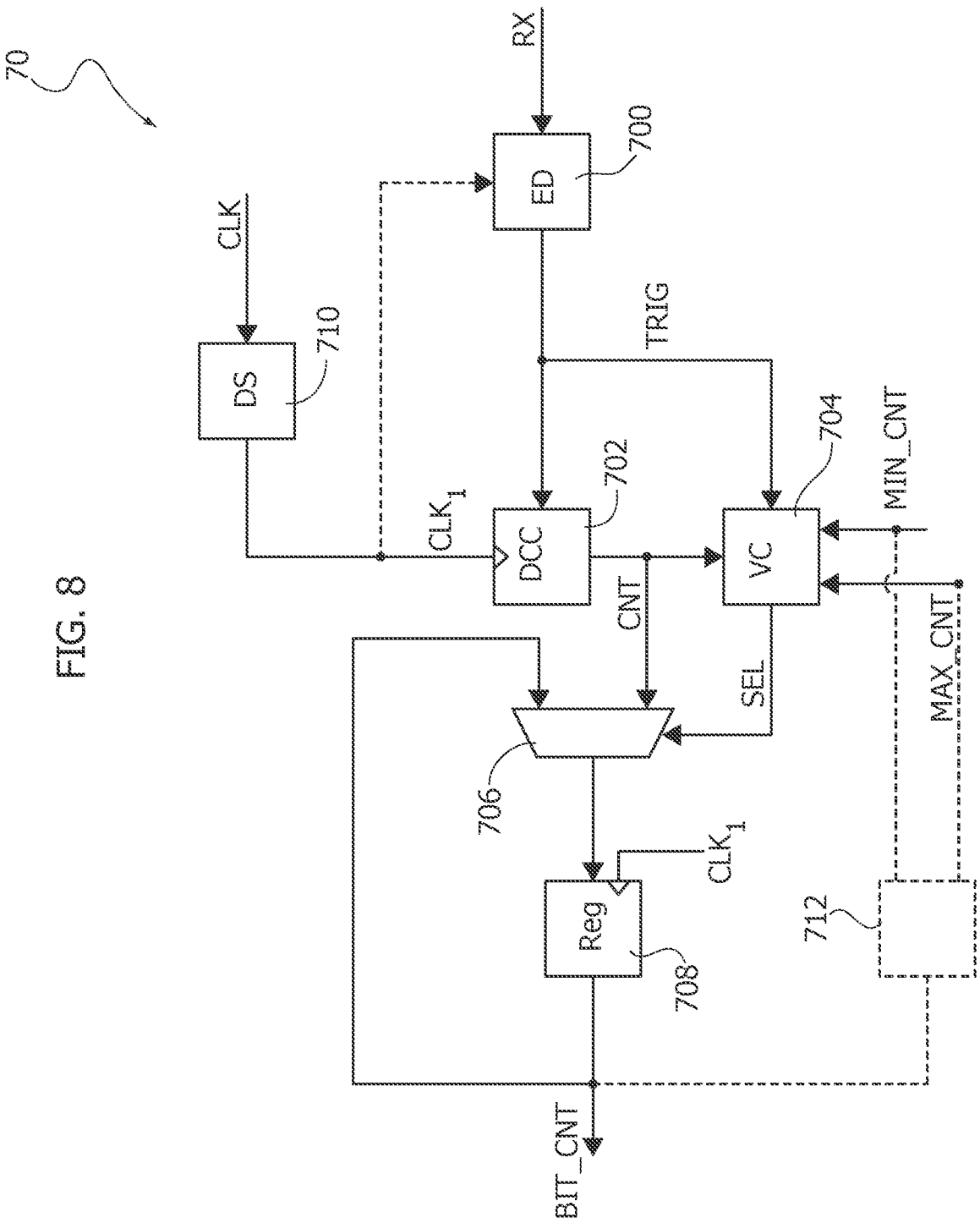
FIG. 8 shows an embodiment of a baud rate detection circuit for the UART interfaces of FIGS. 5, 6 and 7.

FIG. 8 shows an embodiment of the baud rate detection circuit 70.

In the embodiment considered, the baud rate detection circuit 70 uses a clock signal $CLK_1$, which is derived from the clock signal CLK. In general, the clock signal $CLK_1$ may correspond to the clock signal CLK or correspond to a frequency down-scaled version of the clock signal CLK. For example, in various embodiments:

when the down-scaling circuit 5064 of the UART interface 506 uses also a second clock scaling circuit 5080, the clock signal $CLK_1$ is generated via a clock down-scaling circuit (DS) 710 receiving at input the clock signal CLK and having the same scaling factor as the clock scaling circuit 5080; and when the down-scaling circuit 5064 of the UART interface 506 does not use a second clock scaling circuit 5080, the clock signal $CLK_1$ corresponds to the clock signal CLK.

In the embodiment considered, the reception signal RX is provided to an edge detector (ED) 700. Generally, this edge detector 700 may also correspond to the edge detector of the reception control circuit 5086. In this respect, the baud rate detection circuit 70 could also be implemented directly within the reception control circuit 5068.

Specifically, in the embodiment considered, the edge detector 700 generates a signal TRIG, such as a trigger signal, used to signal rising and falling edges in the reception signal RX. For example, the edge detector 700 may generate a pulse in the trigger signal TRIG, e.g., by asserting the signal TRIG for a clock cycle of the clock signal $CLK_1$, in response to detecting an edge in the reception signal RX (see also the respective description of the edge detector of the reception control circuit 5068).

In the embodiment considered, the signal TRIG is provided to a digital counter circuit (DCC) 702. Specifically, the counter circuit 702 is configured to reset a count value CNT when the signal TRIG signals an edge in the reception signal RX, e.g., when the signal TRIG is asserted, and increase the count value CNT when the signal TRIG does not signal an edge in the reception signal RX, e.g., when the signal TRIG is de-asserted. As will be described in greater detail in the following, the counter 702 may also use a maximum count value MAX_CNT, i.e., the counter 702 is configured to increase the count value CNT until the maximum count value MAX_CNT is reached or the signal the signal TRIG signals an edge in the reception signal RX.

In the embodiment considered, the count value CNT and the signal TRIG are provided to a validation circuit 704. Specifically, the validation circuit (VC) 704 is configured to determine whether the count value CNT is in a given range. For example, in various embodiments, the validation circuit 704 may determine whether the count value CNT is smaller than a maximum count value, e.g., corresponding to the previously mentioned value MAX_CNT. Generally, the validation circuit 704 may also determine whether the count value CNT is greater than a minimum count value MIN_CNT, wherein the value MIN_CNT is smaller than the value MAX_CNT.

Specifically, in response to determining that the count value CNT is in the given permitted range, e.g., smaller than the maximum count value MAX_CNT, the validation circuit 704 asserts a control signal SEL. Conversely, in response to determining that the count value CNT is not in the given permitted range, e.g., greater than the maximum count value MAX_CNT, the validation circuit 704 de-asserts the control signal SEL.

In the embodiment considered, the control signal SEL is provided to a register (Reg) 708, which is configured to provide a signal BIT_CNT by storing the count value CNT in response to the clock signal $CLK_1$ (or also the clock signal CLK) when the control signal SEL is asserted. For example, for this purpose, the control signal SEL may be provided to a multiplexer 706 configured to receive at input the count value CNT and the signal BIT_CNT, wherein the multiplexer 706 provides at output the count value CNT when the control signal SEL is asserted.

Accordingly, in various embodiments, the baud rate detection circuit 70 is configured to generate a signal BIT_CNT indicative of the number of clock cycles of the clock signal $CLK_1$ between two consecutive edges of the reception signal RX.

Accordingly, in the embodiment considered, the baud rate detection circuit 70 automatically adjusts the signal BIT_CNT based on the actual bit-time. Accordingly, in various embodiments, the threshold value BAUD_THR for the clock scaling circuit 5078 may be derived from the signal BIT_CNT. Specifically, by using a down-scaling circuit 710 having the same scaling factor as the down-scaling circuit 5080 (when used), the signal BIT_CNT may directly be used as threshold value BAUD_THR. However, in case the down-scaling circuit 710 is omitted or has a different same scaling factor than the down-scaling circuit 5080 (when used), the signal BIT_CNT may also be scaled in order to generate the threshold value BAUD_THR.

Accordingly, in various embodiments, the register 708 may correspond to respective bits of the control register CTRL of the UART interface 50 providing the signal BAUD_THR. Alternatively, a flag of the control register CTRL may indicate whether the signal BAUD_THR should be provided by the control register CTRL or be derived from the signal BIT_CNT.

In this respect, the baud rate detection circuit 70 is configured to update the signal BIT_CNT only when the number of clock cycles CNT between two consecutive edges (as verified by the validation circuit 704) is in a given permitted range, in particular smaller than a maximum value MAX_CNT and optionally greater than a minimum value MIN_CNT.

Specifically, in various embodiments, the transmitter circuit, such as the circuits 30 or 40, is expected to transmit data with a given nominal baud rate NOM_BAUD, such as 19,200, which corresponds to a given nominal count value NOM_CNT of the counter 702 (based on the frequency of the clock signal $CLK_1$). For example, the bit time of a single bit would in this case be approximately 52 us (microseconds). Accordingly, by using a clock signal $CLK_1$ having a frequency f of 2 MHz, the nominal count value NOM_CNT for a single bit would be 104 for a bit time of 52 us, i.e., NOM_COUNT=f/NOM_BAUD.

In this respect, the validation circuit 704 permits to verify whether the count value CNT indicates indeed the time of a single bit or a plurality of bits having the same logic value. In fact, the count value CNT would be the same for the following bit sequences:
"000011110000" transmitted with a baud rate of 38,400; and
"001100" transmitted with a baud rate of 19,200; and
"010" transmitted with a baud rate of 9,600.

Accordingly, in various embodiments, the validation circuit is configured to assert the signal SEL only when the count value CNT is smaller than the maximum value MAX_CNT, which is set to MAX_CNT=NOM_COUNT×2, i.e., the baud rate of the reception signal RX has to be greater than a minimum baud rate corresponding to NOM_BAUD/2, e.g., 9,600 baud. This condition filters thus also the transmission of plural bits with the same logic level.

Conversely, the maximum baud rate may be defined by design and/or the validation circuit 704 may be configured to assert the signal SEL only when the count value CNT is also greater than the minimum value MIN_CNT, which is set to MIN_CNT=NOM_COUNT/2, i.e., the baud rate of the reception signal has to be smaller than a maximum baud rate corresponding to NOM_BAUD×2, e.g., 38,400 baud.

Accordingly, in this case, the transmitted circuit may vary the baud rate BAUD_RATE of the signal RX in the range between the minimum baud rate and the maximum baud rate, i.e., NOM_BAUD/2<BAUD_RATE<NOM_BAUD×2. Accordingly, the baud rate BAUD_RATE may correspond to any permitted baud rate and not only the standard baud rates.

Generally, as shown in FIG. 8, the threshold value MAX_CNT and the threshold value MIN_CNT (when used) may also be derived from the signal BIT_CNT. For example, the baud rate detection circuit 70 may comprise a circuit 712 configured to generate the signals MAX_CNT and optionally MIN_CNT via the following operations:
MAX_CNT=BIT_CNT×2, e.g., by performing a shift-left operation adding a new least-significant bit to the signal BIT_CNT;
MIN_CNT=BIT_CNT/2, e.g., by performing a shift-right operation removing the least-significant bit of the signal BIT_CNT.

Accordingly, in this way, the transmitter circuit may vary the used baud rate from the initial nominal value in order to increase or decrease the baud rate used during the data exchange with the processing system 10a. In fact, in this case, it is sufficient that the baud rate of the communication of a given UART frame is in a range between the half and the double of the baud rate of the previous UART frame.

In various embodiments, the circuit 712 may also reset the values MAX_CNT and optionally MIN_CNT to the initial values calculated as a function of the nominal value NOM_COUNT when the edge detector 700 does not signal the reception of data for a given time period.

In this respect, in order to detect whether the communication is operating correctly, the transmitter circuit 30 or 40 may thus transmit one or more (e.g., debug) command packets with a given baud rate and verify whether the processing system 10a responds (within a given maximum time) with a respective debug response packet indicating that the communication is working correctly. Accordingly, the transmitter circuit may be configured to:
increase the baud rate, when the (e.g., debug) response packet is received correctly; and
decrease the baud rate, when the (e.g., debug) response packet is not received correctly.

In particular, compared to traditional baud rate negotiation mechanisms, the described baud rate detection and variation solutions may not only be used at the beginning of the communication, e.g., in order to set a highest possible baud rate, but the transmitter circuit may adjust the baud rate of the transmitted UART frames during the data transmission operation, i.e., in real-time, and the receiver circuit is able to dynamically adjust the baud rate used to receive the UART frames via the baud rate detection circuit 70. Accordingly, the communication is more robust, because in case of a missing response from the receiver circuit, the transmitter circuit may re-transmit the same (command or data) packet, while reducing on-the-fly the baud rate, until the receiver circuit again responds with a response packet, thereby avoiding that the communication is interrupted or even single packets are lost.

The claims are an integral part of the technical teaching of the disclosure provided herein.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A processing system, comprising:
a transmission terminal configured to provide a transmission signal;
a reception terminal configured to receive a reception signal;
a Universal Asynchronous Receiver-Transmitter communication interface comprising:
a transmission data register;
a reception data register,
a clock management circuit configured to receive a clock signal and generate a down-scaled clock signal as a function of a clock scaling factor;
a transmission circuit configured to sequentially transmit via said transmission signal a given number of transmit bits stored to said transmission data register in response to said down-scaled clock signal; and
a reception circuit configured to sequentially receive via said reception signal a given number of receive bits in response to said down-scaled clock signal and store said receive bits to said reception data register;
a baud-rate detection circuit comprising:
a further clock management circuit configured to receive said clock signal and generate a further clock signal corresponding to either said clock signal or a frequency scaled-down version of said clock signal;
an edge detector configured to generate a first control signal indicating edges in said reception signal;
a digital counter circuit configured to:
monitor said first control signal;
reset a count value in response to determining that said first control signal signals an edge in said reception signal; and
increase said count value based on said clock signal in response to determining that said first control signal does not signal an edge in said reception signal;
a validation circuit configured to:
monitor said first control signal and said count value;
assert a second control signal, when said count value is smaller than a maximum value, in response to determining that said first control signal signals an edge in said reception signal; and
de-assert said second control signal, when said count value is equal to or greater than said maximum value, in response to determining that said first control signal does not signal an edge in said reception signal; and
a register configured to provide a threshold signal by storing said count value when said second control signal is asserted;
wherein said clock scaling factor is derived from said threshold signal.

2. The processing system according to claim 1, wherein said clock management circuit comprises a first down-scaling circuit configured to generate a pre-scaled clock signal or said down-scaled clock signal via a first counter configured to increase a first count value in response to said clock signal until the first count value reaches a first threshold value, wherein said first threshold value is derived from said threshold signal.

3. The processing system according to claim 2, wherein said clock management circuit comprises a second down-scaling circuit configured to receive said pre-scaled clock signal and generate said down-scaled clock signal as a function of a second clock scaling factor, and wherein said further clock management circuit comprises a third down-scaling circuit configured to receive said clock signal and generate said further clock signal as a function of said second clock scaling factor.

4. The processing system according to claim 1, wherein said maximum value corresponds to a double of a nominal count value.

5. The processing system according to claim 4, wherein said baud-rate detection circuit is configured to adjust said maximum value as a function of said threshold signal.

6. The processing system according to claim 1, wherein said validation circuit is configured to assert said second control signal only when said count value is also greater than a minimum value.

7. The processing system according to claim 6, wherein said minimum value corresponds to half of a nominal count value.

8. The processing system according to claim 7, wherein said baud-rate detection circuit is configured to adjust said minimum value as a function of said threshold signal.

9. The processing system according to claim 1, further comprising:
a microprocessor configured to execute software instructions;
a non-volatile memory configured to store said software instructions; and
a debug interface configured to analyze content of said reception data register and determine one or more debug command packets used to write new software instructions to said non-volatile memory.

10. The processing system according to claim 9, wherein said debug interface is configured to store, in response to each debug command packet, a respective debug response packet to said transmission data register.

11. The processing system according to claim 1, wherein said baud-rate detection circuit is configured to generate said clock scaling factor for said Universal Asynchronous Receiver-Transmitter communication interface.

12. An integrated circuit comprising a processing system according to claim 1.

13. A system comprising:
a processing system according claim 1; and
a UART transmitter circuit configured to sequentially transmit data via said reception signal according to a given baud rate.

14. The system according to claim 13, wherein said UART transmitter circuit is configured to vary said baud rate during the transmission of said data.

* * * * *